United States Patent [19]

Mori

[11] Patent Number: 4,675,680

[45] Date of Patent: Jun. 23, 1987

[54] ANTENNA TRACKING DEVICE

[75] Inventor: Koichi Mori, Tokyo, Japan

[73] Assignee: NEC Corporation, Japan

[21] Appl. No.: 744,136

[22] Filed: Jun. 12, 1985

[30] Foreign Application Priority Data

Jun. 20, 1984 [JP] Japan ................... 59-126808

[51] Int. Cl.$^4$ ............................................. H04B 7/155
[52] U.S. Cl. ..................................... 342/352; 342/356; 342/367
[58] Field of Search ............... 343/7.4, 352, 356, 359, 343/422, 426; 342/367, 73-81, 352, 359, 422, 426

[56] References Cited

U.S. PATENT DOCUMENTS

| | | | |
|---|---|---|---|
| 3,156,915 | 11/1964 | Lang et al. ........................... | 343/422 |
| 3,878,522 | 4/1975 | Gurak et al. ......................... | 343/422 |
| 4,247,857 | 1/1981 | Wilcke et al. ........................ | 343/426 |
| 4,334,226 | 6/1982 | Eguchi et al. .................. | 343/422 X |
| 4,336,542 | 6/1982 | Bielli et al. ...................... | 343/352 X |

OTHER PUBLICATIONS

M. Skolnik, *Radar Handbook;* pp. 8-7 through 8-13; (McGraw-Hill, 1970).

Primary Examiner—Theodore M. Blum
Assistant Examiner—Bernarr Earl Gregory
Attorney, Agent, or Firm—Laff, Whitesel, Conte & Saret

[57] ABSTRACT

An antenna tracking device comprising an antenna which is so controlled in direction as to receive a plurality of beacon signals at different frequencies transmitted from a plurality of stationary satellites, respectively, which are spaced apart from each other by a relatively small distance, error detector connected to the feed of the antenna for detecting error signals each representing the difference between the incoming direction of each beacon signal and the axial direction of the main beam of the antenna, reference signal generator responsive to each beacon signal delivered to a receiver for generating a reference signal, and a tracking receiver which receives the reference signals and the error signals to generate the tracking error signals each consisting of mutually orthogonal components. The antenna tracking device of the type described above further includes synthesizer means for combining the components in the same directions of the tracking error signals from the tracking receiver, thereby generating the antenna driving signals. In response to these driving signals, the antenna is directed to the midpoint or center of a plurality of stationary satellites.

3 Claims, 5 Drawing Figures

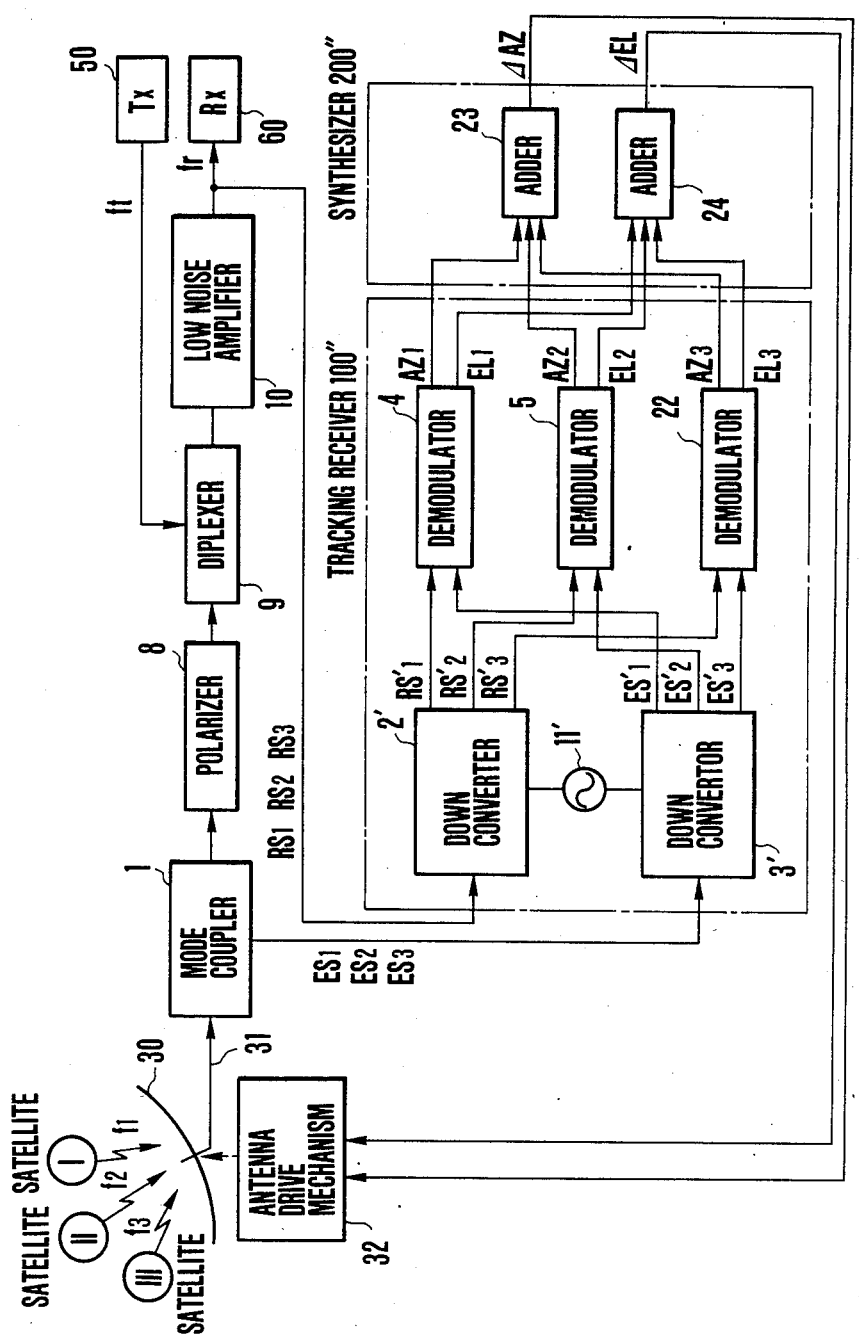

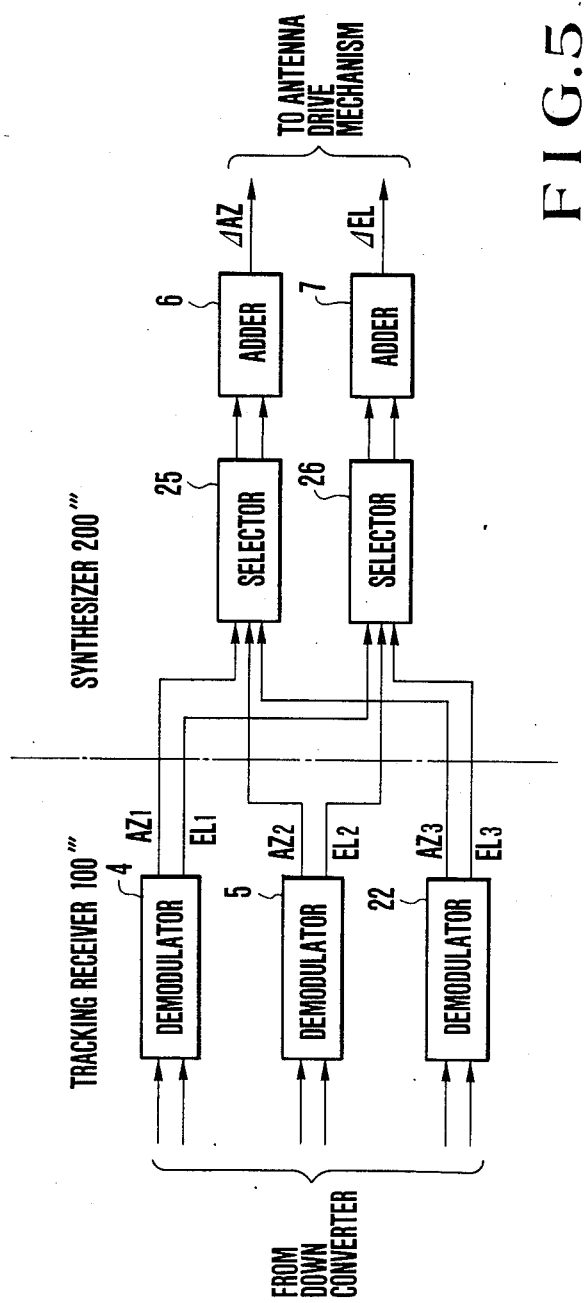

ANTENNA TRACKING DEVICE

BACKGROUND OF THE INVENTION

The present invention relates to an antenna tracking device and more particularly an antenna tracking device capable of simultaneously tracking a plurality of stationary communication satellites spaced apart from each other by a relatively very short distance.

Due to the development of communication satellites, there has been realized a direct broadcasting satellite system in which a stationary satellite directly transmits broadcast waves to general viewers and listeners and the transmitted broadcast waves can be received by means of simple receivers. In the direct broadcast satellite system, in order that the viewers and listeners may install an antenna for receiving a plurality of broadcast programs, a plurality of frequencies (for example, 8 frequency bands at 110 degree of east longitude are assigned to the same stationary orbit position. Meanwhile, when one stationary satellite broadcasts a plurality of broadcast programs each with a high transmission power so that the viewers on the earth can receive them by means of simple receivers, there arises a problem that from the viewpoint of technology and cost it is difficult to fabricate a large-sized stationary satellite and launch it to a stationary orbit. As a result, a plurality of stationary satellites must be placed on the same orbit position or positioned in closely spaced apart relationship. In this case, a plurality of satellites transmit a plurality of beacon signals at different frequencies, respectively, and a ground control station receives them and controls the orbit positions, but their relative positions change due to variations in orbit inclination angle and in drift on the orbit. Since the antennas used by the general viewers are small in size and have a wide beam, the reception is not adversely affected by the positional variations. However, in the uplink for transmitting the program from the earth to a communication satellite, in general, a large-aperture, high-gain and narrow-beam antenna is used. As a result, there arises a problem that when the antenna is directed to one satellite, the gains in the directions to the remaining satellite are decreased. It is, however, economically very inadvantageous to install a plurality of uplink antennas on the earth so that each antenna is directed to each communication satellite.

SUMMARY OF THE INVENTION

In order to overcome the above-described problems, the object of present invention is to provide a monopulse type antenna tracking-device which can direct an antenna automatically substantially to the center of a plurality of satellites.

An antenna tracking device in accordance with the present invention comprises an antenna with an antenna drive mechanism for controlling the direction of the antenna to receive a plurality of beacon signals at different frequencies transmitted from a plurality of stationary satellites, respectively, spaced apart from each other by a relatively very small distance; error detector means connected to the feed of said antenna for deriving error signals each representing the difference between the axial direction of the main beam of said antenna and the incoming direction of each beacon signal; reference signal generator means responsive to each of the received beacon signals for producing a reference signal corresponding to each of a plurality of stationary satellites; and tracking receiver means responsive to said reference signals and said error signals for delivering tracking error signals each consisting of mutually orthogonal components, and further comprises synthesizer means connected to the output of said tracking receiver means, obtaining the combined or synthesized signal of the components in the same direction of each tracking error signal and feeding the combined or synthesized signals thus obtained to the drive mechanism of the antenna.

The antenna tracking device with the above-described construction can direct the antenna to substantially the center position of a plurality of stationary satellites.

BRIEF DESCRIPTION OF THE DRAWINGS

FIG. 4 is a block diagram of a third embodiment of the present invention capable of tracking three stationary satellites; and FIG. 5 is a block diagram of a synthesizer means in accordance with the present invention which is used to track three stationary satellites.

DESCRIPTION OF THE PREFERRED EMBODIMENTS

Referring now to the accompanying drawings, the preferred embodiments of the present invention will be described in detail.

Figure 1:
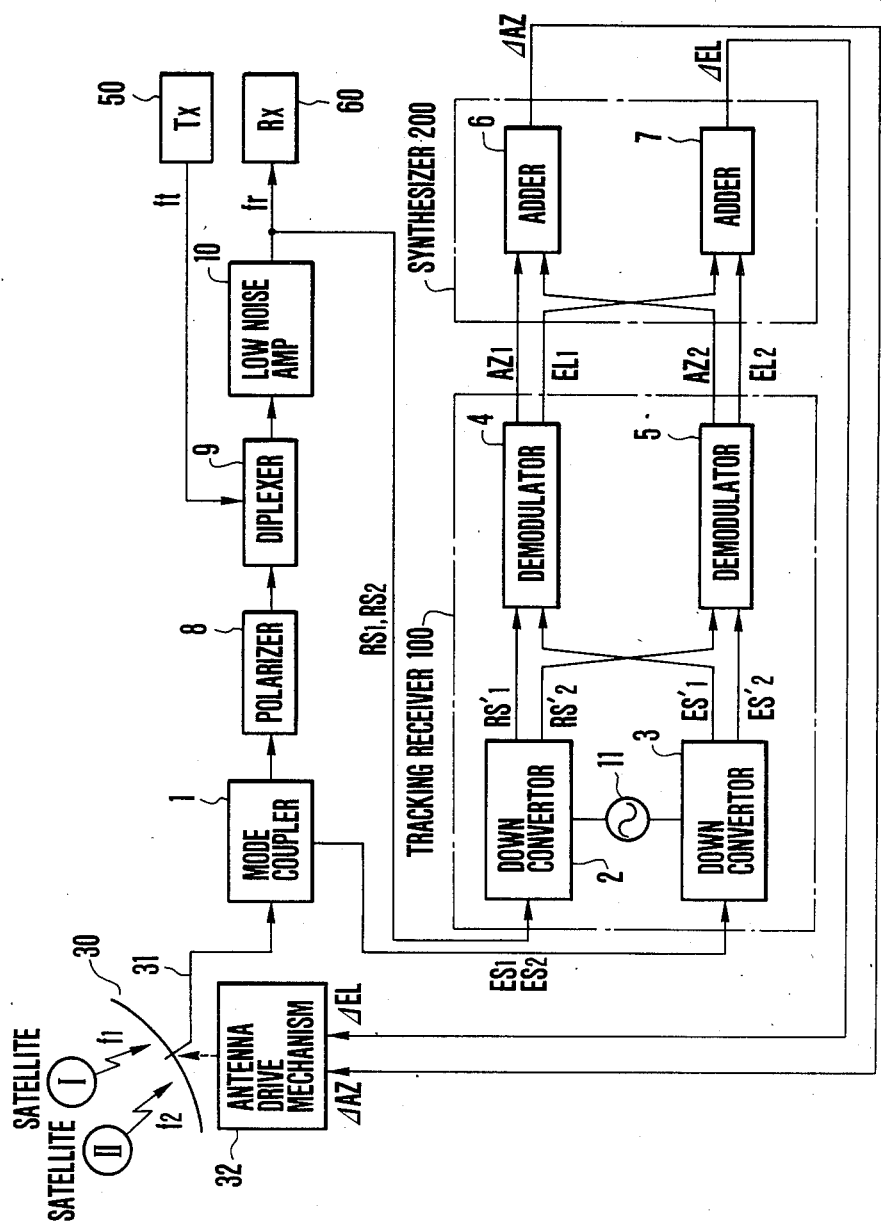
FIG. 1 is a block diagram of a first embodiment of an antenna tracking device in accordance with the present invention.

Referring first to FIG. 1, reference numeral 30 designates an antenna which is driven by an antenna drive mechanism 32 to receive the beacon signals $f_1$ and $f_2$ transmitted from a plurality (two in this embodiment) of communication stationary satellites I and II. A $TM_{01}$ mode coupler 1 is connected to the antenna feed 31.

As it is well known in the art, when the antenna boresight axis (the axial direction of the main beam of the antenna) is in the direction of the satellite, the electro-magnetic field excited in the feed waveguide by a received signal is only of the dominant mode. However, when the antenna axis is offset from the direction of the satellite, an axial component of electric field is generated and higher modes are excited besides the dominant mode. In the higher mode detection system, the tracking signals are obtained by picking up one or more of these higher modes in the waveguide. Tracking is made by using the dominant mode as the sum or reference signal and the higher mode as the error signal.

Such modes of lower order as $TM_{01}$, $TE_{21}$ and $TE_{01}$ are used as the higher modes for satellite tracking. Of these the $TM_{01}$ mode is used for circular polarization, and either the combination of $TM_{01}$ and $TE_{01}$ modes or the $TE_{21}$ mode alone is used for linear polarization.

In this embodiment is used the $TM_{01}$ mode coupler 1 for deriving the $TM_{01}$ mode signal generated in a circular waveguide as the error signal with respect to the boresight axis in which the electromagnetic wave arrives. The error signals $ES_1$ and $ES_2$ which are derived from the mode coupler 1 and which correspond to the beacon signals $f_1$ and $f_2$, respectively, are applied to the input of a down coverter 3 of a tracking receiver 100 comprising two channels.

Another signal (sum signal) of the dominant mode from the mode coupler 1 passes through a polarizer 8 for converting the circularly polarized wave into the linearly polarized wave, a diplexer 9 for effecting the separation between and the combination of the transmitted signal $f_t$ and the received signal $f_r$ and a low noise amplifier 10. Of the output signals from the low noise amplifier 10, the received signal $f_r$ is applied to a communication receiver 60 while the beacon signals $f_1$ and $f_2$ are applied as the reference signals $RS_1$ and $RS_2$ to a down converter 2 of the tracking receiver 100. The reference signals (sum signals) $RS_1$ and $RS_2$ and the error signals $ES_1$ and $ES_2$ from the mode coupler 1 are coverted into the intermediate frequency signals $RS_1'$, $RS_2'$, $ES_1'$ and $ES_2'$, respectively, by means of a local oscillator 11 which is used in common by the down converters 2 and 3. The output $RS_1'$ from the down converter 2 and the output $ES_1'$ from the down converter 3 are applied to the input of a demodulator 4 of the tracking receiver 100 while the output $RS_2'$ from the down converter 2 and the output $ES_2'$ from the down converter 3 are applied to the input of a demodulator 5 of the tracking receiver 100. The demodulator 4 detects the phase and amplitude of the error signal $ES_1'$ corresponding to the beacon signal $f_1$ relative to the reference signal (sum signal) $RS_1'$ and delivers the azimuth and elevation tracking error signals $AZ_1$ and $EL_1$ while the demodulator 5 detects the phase and amplitude of the error signal $ES_2'$ corresponding to the beacon signal $f_2$ relative to the reference signal $RS_2'$ (sum signal) and delivers the azimuth and elevation tracking error signals $AZ_2$ and $EL_2$.

The azimuth tracking error signals $AZ_1$ and $AZ_2$ derived from the demodulators 4 and 5, respectively, are applied to an adder 6 in a synthesizer 200 while the elevation tracking error signals $EL_1$ and $EL_2$ derived from the demodulators 4 and 5, respectively, are fed to an adder 7 of the synthesizer 200. The adders 6 and 7 obtain the sum of the azimuth tracking error signals and the sum of the elevation tracking error signals which correspond to the beacon signals $f_1$ and $f_2$ and deliver $\Delta AZ = AZ_1 + AZ_2$ and $\Delta EL = EL_1 + EL_2$, respectively, as the control signals, to the antenna drive mechanism 32 so that the control for making $\Delta AZ$ and $\Delta EL$ "0" is effected. In the first embodiment, the arrangement from the antenna 30 to the demodulator 4 or 5 of the tracking receiver 100 is similar to the conventional two-channel monopulse type antenna tracking device for circularly polarized wave and when the antenna drive mechanism 32 is controlled only in response to the outputs $AZ_1$ and $EL_1$ from the demodulator 4, the satellite I which transmits the beacon signal $f_1$ can be automatically tracked. In like manner, when the antenna drive mechanism 32 is controlled only in response to the outputs $AZ_2$ and $EL_2$ from the demodulator 5, the satellite II which transmits the beacon signal $f_2$ can be automatically tracked.

According to the first embodiment of the present invention as shown in FIG. 1, however, the adders 6 and 7, which constitute the synthesizer 200, obtain the sums of the azimuth and elevation tracking error singals from the two satellites and the antenna drive mechanism 32 is controlled in response to the sum signals $\Delta AZ$ and $\Delta EL$ so that the antenna 30 is directed toward the midpoint between the two satellites I and II.

Figure 2:
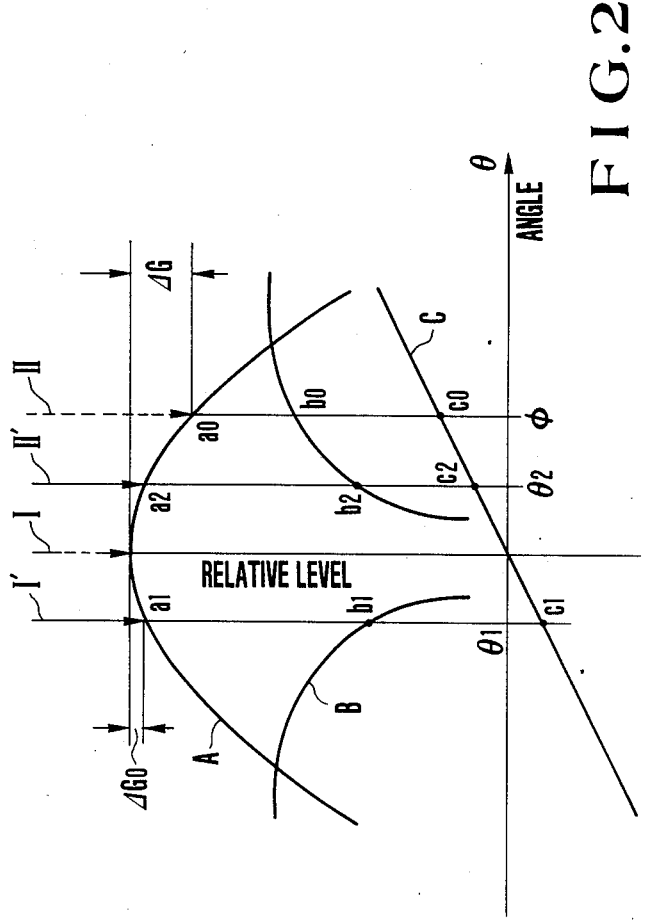
FIG. 2 is an antenna pattern diagram used to explain the relationship between an antenna pattern and tracking error signals.

FIG. 2 is an antenna pattern diagram used to explain the relationship between an antenna pattern in a plane passing the antenna boresight axis (the center of the main beam) and the tracking error signals. A shows the reception pattern of the main beam; B, the output in $TM_{01}$ mode from the mode coupler 1 (the tracking error signal pattern) and C, the tracking error signal outputs from the demodulators 4 and 5, these pattern and output curves being plotted at angles $\theta$ from the center of the main beam. It is seen that the curve C becomes substantially linear in the vicinity of $\theta = 0$. Assume that of the two satellites which are spaced apart from each other by an angular difference $\phi$ only in the azimuth direction, one satellite I transmitting the beacon signal $f_1$ be tracked in the conventional manner in response to the tracking error signal outputs $AZ_1$ and $EL_1$ derived from the demodulator 4. Then, as indicated by the broken-line arrow, the direction of the satellite I coincides with the center of the main beam so that both $AZ_1$ and $EL_1$ become zero. However, the satellite II is offset from the center of the main beam and its gain becomes $a_0$ which is lower than the gain of the satellite I by $\Delta G$. In this case, when the beacon signal $f_2$ from the satellite II is simultaneously received, the error signal from the mode coupler 1 becomes $b_0$ and the tracking error signal $AZ_2$ from the demodulator 5 becomes $c_0$. Therefore, when the antenna drive mechanism 32 is controlled in response to the sum of the outputs $AZ_1$ and $AZ_2$ from the demodulators 4 and 5 as described above with reference to FIG. 1, the main beam is controlled to extend between the satellites I and II as indicated by the solid-line arrows I' and II'. As a result, the main beam gains become $a_1$ and $a_2$; the error signals from the mode coupler 1 become $b_1$ and $b_2$; and the tracking error signals from the demodulators 4 and 5 become $c_1$ and $c_2$, respectively. In this case, it can be so controlled that $c_1 + c_2 = 0$. Therefore, when the curve C is assumed linear, the position of each satellite is such that $\theta_1 = -\theta_2 = \phi/2$ so that the antenna gains for both the satellites I and II are equal and the difference $\Delta G0$ between the main beam gain $a_1$ or $a_2$ and the gain at the center of the main beam becomes considerably smaller than the gain difference $\Delta G$. In like manner, the elevation can be controlled in response to the sum of the tracking error signals $EL_1$ and $EL_2$ obtained by the adder 7. Therefore, even when the satellites I and II change in both the azimuth and elevation directions due to the variations in angle of inclination with respect to the orbit and due to the drifts on the orbit, the antenna can be normally directed at the midpoint between the two satellites I and II so that the decrease in gain for the two satellites I and II can be maintained at a minimum.

Figure 3:
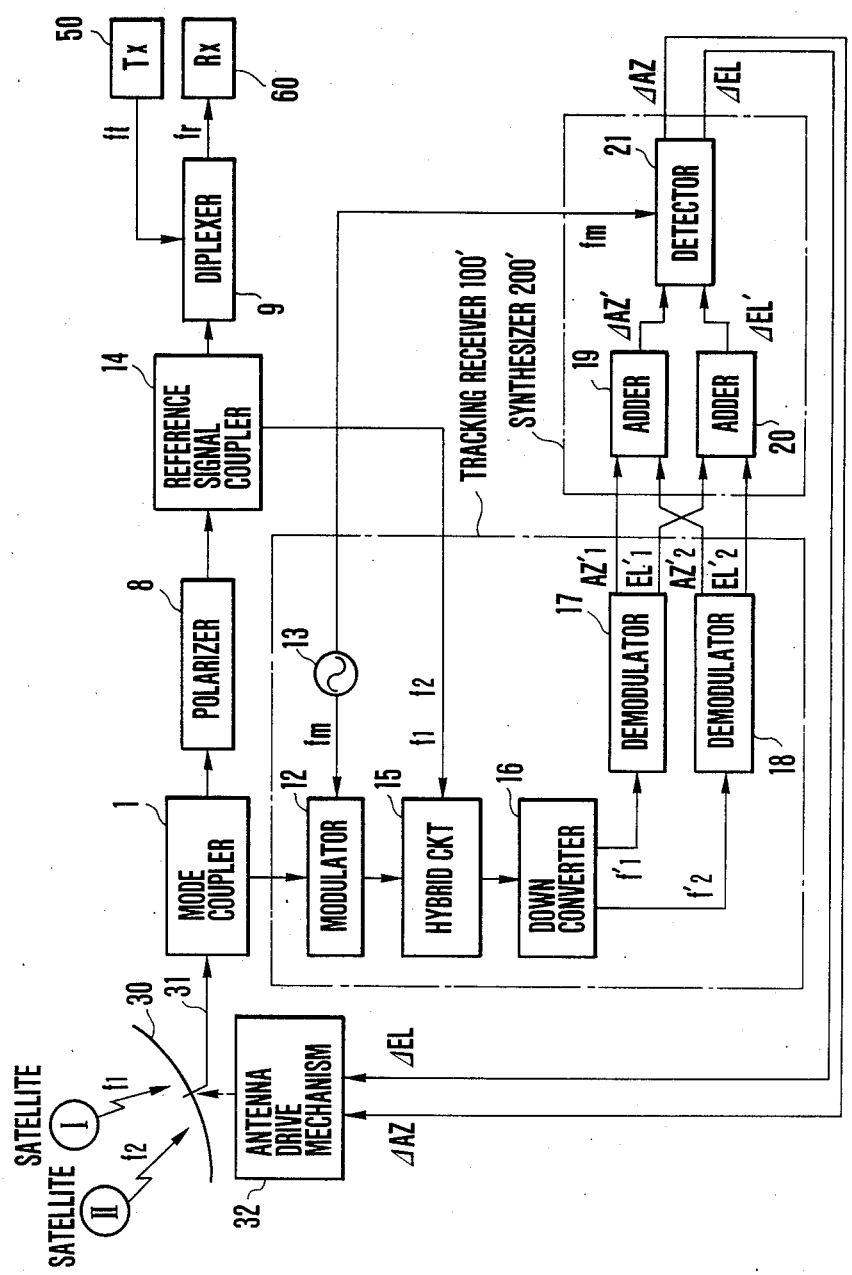
FIG. 3 is a block diagram of a second embodiment of the present invention.

FIG. 3 is a block diagram of a second embodiment of the present invention in which is used a single-channel type tracking receiver 100'. The error signal detected by the mode coupler 1 is applied to a tracking receiver 100' and is subjected to the carrier suppression modulation (for example, two-phase PSK modulation) by a modulator 12 in response to the signal $f_m$ from a low-frequency ($f_m$) oscillator 13. The output from the modulator 12 is combined in a hybrid circuit 15 with the reference signals (sum signals) $f_1$ and $f_2$ separated by a reference signal coupler 14. The combined signals $f_1$ and $f_2$ are translated into the intermediate frequency signals $f_1'$ and $f_2'$ by a tracking down converter 16 and then demodulated by tracking demodulators 17 and 18, respectively, so that the tracking error signals $AZ_1'$, $EL_1'$, $AZ_2'$ and $EL_2'$ with the modulation frequency $f_m$ for the beacon signals $f_1$ and $f_2$ are derived. These outputs are supplied to synthesizer 200' and are combined by adders 19 and 20 with an AC signal $f_m$ and the combined outputs $\Delta AZ'$ and $\Delta EL'$ are subjected to coherent detection at a frequency $f_m$ from a low frequency oscillator 13 in a coherent detector 21 so that the azimuth control signal $\Delta AZ$ and the elevation control signal $\Delta EL$ are derived. This arrangement is such that in the conventional tracking receiver with two single-channels in which the DC tracking error signals $AZ_1$, $EL_1$, $AZ_2$ and $EL_2$ are derived by the coherent detection at the modulation frequency $f_m$ of the outputs from the demodulators 17 and 18, the adders 19 and 20 are provided before the detector 21 so that the outputs are combined and the combined signal is converted into the DC control signal by means of single detector 21. Therefore, as in the case of the first embodiment as shown in FIG. 1, the antenna 30 can be directed at the midpoint between the two satellites I and II. In the second embodiment as shown in FIG. 3, it is of course possible to provide an coherent detector after the demodulators 17 and 18 so as to derive a DC control signal and to employ DC adders as in the case of the first embodiment shown in FIG. 1.

FIG. 4 shows a block diagram of a third embodiment of the present invention for tracking three satellites I, II and III. Same reference numerals are used to designate similar parts in FIGS. 1 and 4.

The direction error signals $ES_1$, $ES_2$ and $ES_3$ corresponding to the beacon signals $f_1$, $f_2$ and $f_3$ from the satellites I, II and III are applied to a down converter 3' in a tracking receiver 100" so that intermediate-frequency error signals $ES_1'$, $ES_2'$ and $ES_3'$ are derived as in the case of the first embodiment shown in FIG. 1.

As in the case of the first embodiment shown in FIG. 1, the reference signals $RS_1$, $RS_2$ and $RS_3$ corresponding to the beacon signals $f_1$, $f_2$ and $f_3$, respectively are applied from the low noise amplifier 10 to a down converter 2' of the tracking receiver 100" so that the intermediate-frequency signals $RS_1'$, $RS_2'$ and $RS_3'$ are derived from the down converter 2'.

Reference numerals 4 and 5 denote the tracking demodulators for the beacon signals $f_1$ and $f_2$, respectively, as in the case of the first embodiment shown in FIG. 1 and reference numeral 22 denotes a tracking demodulator for the beacon signal $f_3$ transmitted from the satellite III. The output $RS_1'$ from the down converter 2' and the output $ES_1'$ from the down converter 3' are applied to the demodulator 4; the output $RS_2'$ from the down converter 2' and the output $ES_2'$ from the down converter 3' are applied to the demodulator 5; and the output $RS_3'$ and the output $ES_3'$ from the down converters 2' and 3', respectively, are applied to the demodulator 22. The demodulators 4, 5 and 22 deliver the azimuth and elevation tracking error signals $AZ_1$ and $EL_1$; $AZ_2$ and $EL_2$; and $AZ_3$ and $EL_3$, respectively, which in turn are applied to a synthesizer 200". The synthesizer 200" comprises adders 23 and 24 which obtain the sum of the azimuth tracking error signals $AZ_1$, $AZ_2$ and $AZ_3$ and the sum of the elevation tracking error signals $EL_1$, $EL_2$ and $EL_3$, respectively, and deliver the control signals $\Delta AZ$ and $\Delta EL$, respectively. In the third embodiment, the antenna 30 is so controlled as to direct the center of gravity of a triangle whose vertexes are the positions of the three satellites, respectively. If two of the three satellites coincide in position with each other, the antenna 30 is directed at the point two-thirds from the first and second satellites which coincide with each other on the one hand to the third satellite on the other hand. In this case, the difference in gain becomes greatest, but it can be minimized as compared with the case in which the antenna 30 is so controlled as to track only one satellite.

FIG. 5 shows in block diagram a modified synthesizer used in the third embodiment as shown in FIG. 4 for tracking three satellites. The modification shown in FIG. 5 is substantially similar to the third embodiment as shown in FIG. 4 except that selectros 25 and 26 are disposed in front of the adders 6 and 7 which have been already explained with reference to FIG. 1. The selectors 25 and 26 compare three inputs and select a maximum input and a minimum input. That is, of the three satellites, the intermediate satellite in the azimuth and elevation directions is disregarded to obtain the sums so that the antenna is directed at the midpoint between the remaining satellites. Therefore, as compared with the third embodiment as shown in FIG. 4 in which the sums of all signals are obtained, the gain differences can be further minimized. When two of the three satellites coincide with each other, the antenna 30 is directed at the midpoint between the first and second satellites which coincide with each other on the one hand and the third satellite on the other hand. As a result, the gains for the three satellites become equal.

So far the $TM_{01}$ mode coupler 1 has been used as an error detector for detecting the error information of the direction in which the electromagnetic waves are transmitted from the satellites, but it is to be understood that a linearly-polarized-wave error detector using other higher modes such as a combination of $TM_{01}$ and $TE_{01}$ modes or mutually orthogonal $TE_{21}$ modes of a circular waveguide or a 4-horn type error detector can be employed. Furthermore, instead of the two-channel or single-channel tracking receiver, a three-channel type tracking receiver may be used. The third embodiment and its modification as shown in FIGS. 4 and 5 for tracking three satellites have been described in conjunction with the two-channel tracking receiver, but it is to be understood that, as in the case of the second embodiment described with reference to FIG. 3, the single-channel type tracking receiver may be used to obtain three sums prior to the coherent detector. Furthermore, the present invention may be equally applied when four or more satellites are tracked. So far the present invention has been described in conjunction with the azimuth-elevation antenna, but is is to be understood that the present invention may be equally used with a HADEC or XY type antenna.

What is claimed is:
1. An antenna tracking device comprising
an antenna with an antenna drive mechanism for controlling the direction of said antenna to receive beacon signals simultaneously at different frequencies transmitted from a plurality of stationary satellites spaced apart from each other by a relatively small distance,
error detector means connected to the feed of said antenna for delivering error signals each representing the difference between the axial direction of the main beam of said antenna and the incoming direction of each of said beacon signals,
a reference signal generator responsive to each of said beacon signals for generating a reference signal corresponding to each satellite,
tracking receiver means responsive to each reference signal and each error signal for delivering a tracking error signal comprising mutually orthogonal components, and synthesizer means connected to the output of said tracking receiver means for synthesizing the components in the same direction of said tracking error signals to obtain synthesized signals and delivering said synthesized signals thus obtained to said drive mechanism of said antenna.

2. An antenna tracking device as set forth in claim 1 wherein said synthesizer means includes adders each of which adds the components in the same direction of said tracking error signals.

3. An antenna tracking device as set forth in claim 1 wherein said received beacon signals are at least three and said synthesizer means includes two selector means each of which receives the components in the same direction of the mutually orthogonal components of said tracking error signals and selects a maximum signal and a minimum signal, and adders connected to the outputs of said selector means for adding said maximum and minimum signals, respectively.

* * * * *